United States Patent [19]

Neff

[11] Patent Number: 5,092,365

[45] Date of Patent: Mar. 3, 1992

[54] VALVE WITH ADJUSTABLE VALVE SEAT

[75] Inventor: James A. Neff, Birmingham, Mich.

[73] Assignee: Mac Valves, Inc., Wixom, Mich.

[21] Appl. No.: 670,889

[22] Filed: Mar. 18, 1991

[51] Int. Cl.⁵ .......................................... F15B 13/044
[52] U.S. Cl. ........................... 137/625.65; 137/625.27; 251/129.18
[58] Field of Search ...................... 137/625.27, 625.65; 281/129.18

[56]  References Cited

U.S. PATENT DOCUMENTS 4,574,844  3/1986  Neff et al. ........................ 137/625.65
4,915,134  4/1990  Toliusis et al. .................. 137/625.65
4,971,115  11/1990  Tinholt ............................ 137/625.65

Primary Examiner—Gerald A. Michalsky
Attorney, Agent, or Firm—Robert G. Mentag

[57]  ABSTRACT

A direct solenoid operated poppet valve having an adjustable valve seat that provides a selectively variable flow orifice for supplying a preset air flow requirement. The poppet valve spool stroke is set in accordance with the preset air flow requirement. Then, based on the measured poppet location with respect to the solenoid pole piece, a solenoid push pin is selected that provides the minimum solenoid stroke required for the preset valve stroke and preset air flow requirement.

4 Claims, 3 Drawing Sheets

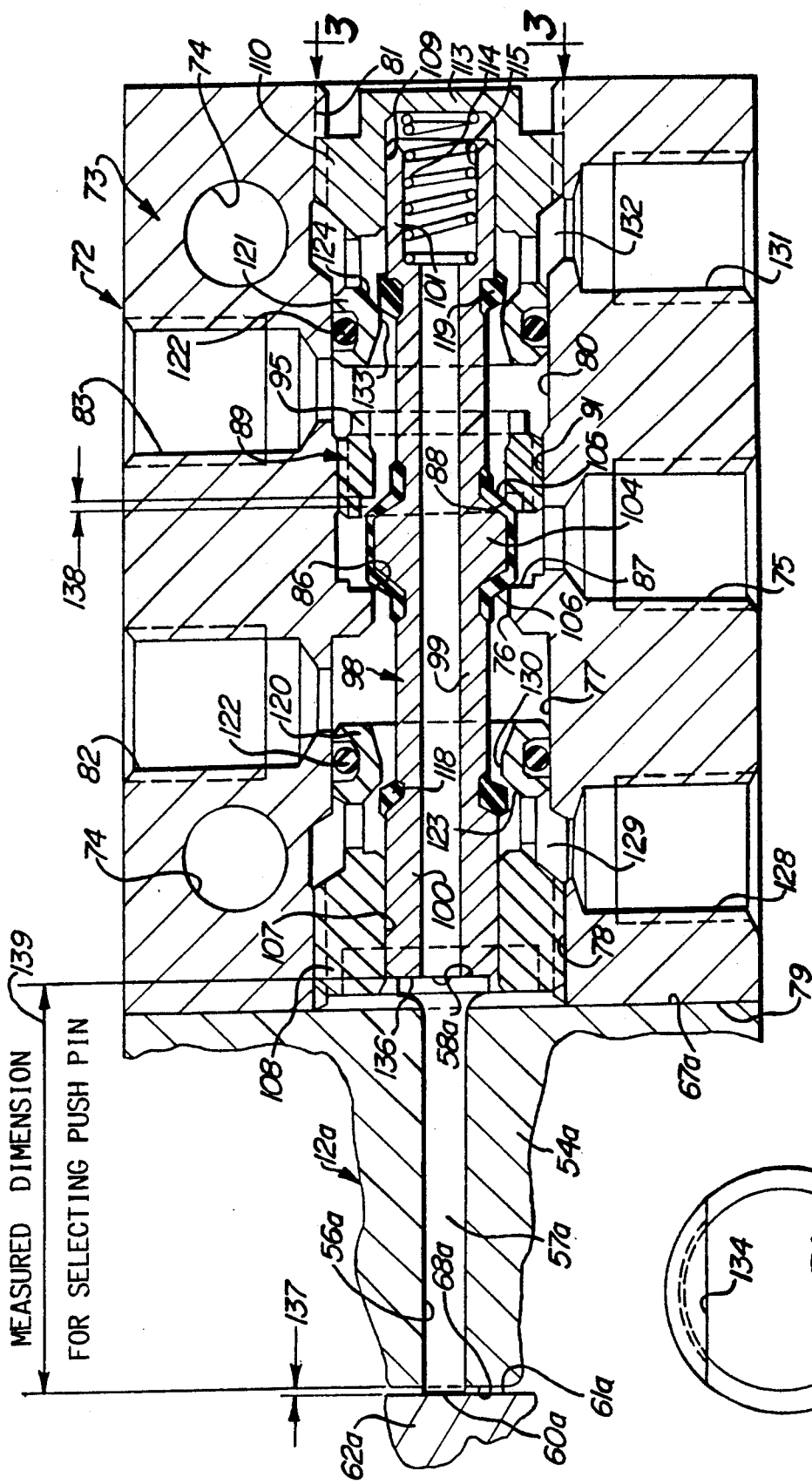

5,092,365

VALVE WITH ADJUSTABLE VALVE SEAT

BACKGROUND OF THE INVENTION

1. Technical Field

The field of art to which this invention pertains may be generally located in the class of devices relating to valves. Class 137, Fluid Handling, U.S. Patent Office Classification, appears to be the applicable general area of art to which the subject matter similar to this invention has been classified in the past.

2. Background Information

This invention relates to direct solenoid operated poppet valves, such as three-way and four-way directional flow control poppet air valves having an adjustable valve seat that provides a variable flow orifice for supplying a preset air flow requirement, with minimum valve and solenoid strokes and maximum air flow control efficiency.

At the present time, industry is requiring smaller and more efficient valves. One of the problems that must be overcome to meet the requirement of smaller and more efficient directional flow control poppet air valves is the reduction of the manufacturing tolerance accumulation between the moving parts of a valve and the parts of the solenoid for operating the valve. The tolerances in a direct solenoid operated poppet air valves of this type are due to poppet and poppet seat locations in the valve body, and push pin and pole piece tolerances in the solenoid.

It is an object of the invention to provide a direct solenoid operated poppet air valve having an adjustable valve seat that provides a variable air flow orifice which permits the valve stroke to be set accurately in accordance with a selected air flow requirement, with a resultant accurate minimum solenoid stroke based on the valve stroke.

It is another object of the invention to provide a method of reducing the manufacturing tolerance accumulation in a direct solenoid operated poppet air valve, so as to selectively provide a poppet air valve with a low air flow requirement and low power solenoid, or with a high air flow requirement and a high power solenoid.

It is a further object of the invention to provide a direct solenoid operated poppet air valve wherein the valve stroke is set, then based on measured poppet location with respect to the solenoid pole piece, a push pin is selected that will provide the minimum solenoid stroke required for the preset valve stroke.

It is still another object of the invention to provide a direct solenoid operated poppet air valve having an adjustable valve seat, and wherein the solenoid is provided with a pole piece.

SUMMARY OF THE INVENTION

The aforegoing objects are accomplished by providing a direct solenoid operated poppet air valve, which has a poppet air valve member carrying a poppet valve element having an angled poppet valve face on each end. The poppet valve element is movably disposed in a valve body between a fixed poppet valve seat and an adjustable poppet valve seat for alternate seating engagement with said angled poppet valve faces. The poppet valve member is moved axially in one direction by a return spring to a position where one of the angled poppet valve faces seats on the fixed poppet valve seat. A flow of air under pressure is put through the flow orifice between the other angled poppet valve face and the adjustable poppet valve seat. The adjustable poppet valve seat is moved toward the other angled poppet valve face on the poppet valve element until the flow of air through said flow orifice reaches a certain air flow requirement.

The poppet valve member is moved in the other direction to seat said other angled poppet valve face on the adjustable poppet valve seat by a directly engagable solenoid. All of the tolerances for manufacturing the poppet valve member, the axial bore in the valve body for the poppet valve member, are controlled from the end of the valve body against which the solenoid is seated. Also, the tolerances for the parts of the solenoid, namely the length of the pole piece, is determined with a minimum of tolerance accumulation from said end of the valve body. The direct solenoid operated poppet air valve of the invention provides a directional flow control poppet air valve with flow control efficiency, a short stroke, and a minimum power solenoid, so as to provide directional flow control air operations with a minimum of energy used.

BRIEF DESCRIPTION OF THE DRAWINGS

FIG. 2 is a horizontal section view of a direct solenoid operated four-way directional flow control poppet air valve provided with a threaded adjustable poppet valve seat, and with the solenoid being shown in a fragmentary, section view.

FIG. 3 is an end view of the right end poppet valve seat retainer shown in FIG. 2, taken along the line 3—3 thereof, and looking in the direction of the arrows.

DESCRIPTION OF THE PREFERRED EMBODIMENTS

Figure 1:
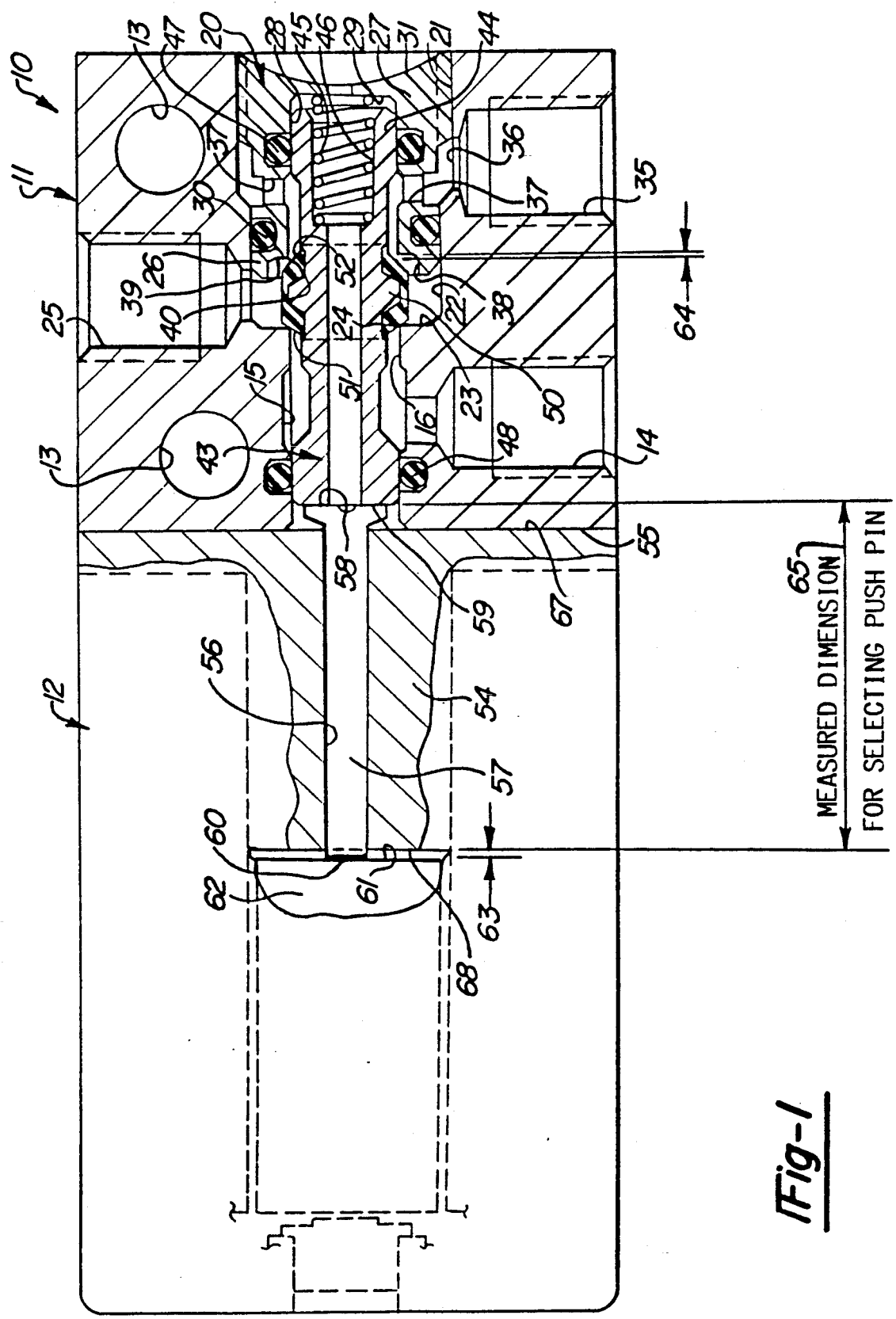
FIG. 1 is a horizontal section view of a direct solenoid operated three-way directional flow control poppet air valve provided with a threaded adjustable poppet valve seat, and with the solenoid shown with parts broken away and parts in section.

Referring to the drawings, and in particular to FIG. 1, the numeral 10 generally designates a direct solenoid operated three-way directional flow control poppet air valve which includes a valve body, generally indicated by the numeral 11, and a solenoid actuator, generally indicated by the numeral 12. The poppet air valve 10 may be used by itself or adapted to be operatively mounted on an air flow control valve to control, as for example, a four-way valve, a three-way valve, a two-way valve, and the like. The valve body 11 is provided with a pair of mounting holes 13 for the reception of suitable mounting bolts to mount the solenoid operated poppet air valve 10 in an operative position.

The valve body 11 is provided with an air inlet port 14 which communicates with an annular groove 15 that is formed in the wall of an axial bore 16 that is formed in the valve body 11, perpendicular to the longitudinal axis of the inlet port 14.

As shown in FIG. 1, a valve retainer, generally indicated by the numeral 20, is seated in a stepped axial bore in the valve body 11. The stepped axial bore for the valve retainer 20 comprises an outer threaded portion 21 which is open to the outer or right end of the valve body 11, as viewed in FIG. 1, and a reduced diameter inner end smooth bore portion 22 which communicates at its inner end with the axial bore 16. The inner end of the reduced diameter bore portion 22 terminates at a transverse shoulder 23, at which point the inner end of the bore portion 22 communicates with the inner end of the axial bore 16 to form a circular, sharp edged poppet valve seat 24. The inner end of the reduced diameter bore portion 22 communicates with a cylinder or supply port 25.

As shown in FIG. 1, the inner end 26 of the valve retainer 20 is cylindrically formed and is slidably mounted in the retainer bore portion 22. An axial bore 28 is formed in the valve retainer 20, and it extends rearwardly from the inner end of the valve retainer 20 and terminates at an end wall 29. An O-ring seal 30 is operatively mounted around the outer periphery of the inner end 26 of the valve retainer 20 and it slidably engages the surface of the bore portion 22. The outer or rear end of the valve retainer 20 is enlarged, and is provided with a threaded periphery that is threadably mounted in the threaded outer bore portion 21 which communicates with the reduced diameter inner bore portion 22. The valve retainer 20 is provided on the outer end thereof with a transverse slot 31 for the reception of a tool such as a screw driver, for turning the valve retainer 20 to a desired location in the stepped diameter axial bore portions 21, 22.

An exhaust port 35 is formed in the valve body 11 adjacent the right end thereof, as viewed in FIG. 1. The exhaust port 35 communicates with the axial bore 16, through an annular groove 36 formed in the periphery of the rear end of the stepped diameter axial bore portion 22 and a plurality of aligned radial passageways 37, which are formed through the side wall of the valve retainer 20. A short axial bore 38 is formed in the inner end of the valve retainer 20, and it is made to a diameter larger then the diameter of the bore 28 in the valve retainer 20. The bore 38 terminates at a shoulder 39 to form a sharp edged poppet valve seat 40 at the junction point with the axial bore 28 in the valve retainer 20.

A poppet valve member or spool, generally indicated by the numeral 43, is movably mounted in the valve body 11, with the outer end 44 thereof disposed in the valve retainer bore 28 and the inner end thereof disposed in the valve body axial bore 16. The poppet valve spool 43 is provided with an elongated, substantially cylindrical body, which has the outer end 44 slidably mounted in the axial bore 28 of the valve retainer 20. The poppet valve spool outer end 44 is seated against a valve spool return spring 45 which has an inner end seated in an axial bore 46 in the poppet valve spool outer end 44. The outer end of the return spring 45 is seated against the end wall 29 formed at the outer end of the axial bore 28 in the valve retainer 20. The outer end 44 of the poppet valve spool 43 has operatively mounted therearound an O-ring seal 47 which is mounted in a suitable groove formed in the periphery of the bore 28 in the valve retainer 20. The inner end of the poppet valve spool 43 has operatively mounted therearound an O-ring seal 48, which is seated in a groove formed in the wall of the axial bore 16 in the valve body 11.

As shown in FIG. 1, the poppet valve spool 43 is provided with a centrally located, annular flange 50 which is conically shaped and has angled outer end faces which converge toward each other, and on which are integrally molded from a suitable elastomeric material, a pair of angled poppet valve faces 51 and 52.

As shown in FIG. 1, the solenoid 12 includes a pole piece 54 which seats directly on the adjacent end surface 55 of the valve body 11. The pole piece 54 has an axial bore 56 formed therethrough which communicates at the outer end thereof with the valve spool axial bore 16. Slidably mounted in the axial bore 56 is a cylindrical valve push pin 57. One end 58 of the valve push pin 57 is seated against the inner end 59 of the poppet valve spool 43. The other end 60 of the valve push pin 57 is seated against the adjacent end 61 of the solenoid armature 62. It will be understood, that the solenoid 12 includes the usual coil and other conventional parts of a solenoid for moving the solenoid armature 62 to the right, as viewed in FIG. 1, to move the valve push pin 57, and in turn to move the poppet valve spool 43, to the right when the solenoid 12 is energized. The solenoid 12 may be a DC or an AC solenoid. The numeral 63 designates the length of the stroke of the solenoid armature 62 when the solenoid 12 is de-energized. The numeral 64 designates the length of the stroke of the poppet valve spool 43 before it is moved from its normal inoperative position shown in FIG. 1 to a position wherein the angled poppet valve face 52 seats on the sharp edged poppet valve seat 40.

The end surface 55 of the valve body 11 functions as a control surface from which the dimensions of the hereinafter discussed parts of the valve 10 and solenoid 12 are measured and controlled with minimum tolerances. The end surface 55 of the valve body 11 is accurately machined to receive the outer end 67 of the pole piece 54. The length of the pole piece 54 is accurately determined, and the inner end 68 of the pole piece 54 is machined to control the length of the pole piece between its ends 67 and 68, with a minimum tolerance. The length of the valve body portion between the valve body end surface 55 and the fixed sharp edged poppet valve seat 24 is determined and machined with a minimum tolerance. The dimensional length of the poppet valve spool 43 between its inner end surface 59 and the poppet valve seat contact point on the angled poppet valve face 51, where it seats on the fixed sharp edged poppet valve seat 24 is determined and machined with a minimum tolerance. The length between the seating points on the angled poppet valve faces 51 and 52 is determined and machined with a minimum tolerance.

In accordance with the invention, a predetermined flow of air through the variable orifice formed by the space between the sharp edged poppet valve seat 40 and the angled poppet valve face 52 may be varied to provide a selected preset flow of air therethrough, by adjusting the position of the sharp edged poppet valve seat 40 axially inward or outward. With the poppet valve spool 43 in the position shown in FIG. 1, the port 35, which is normally an exhaust port, would be connected to a source of air under pressure, and the flow of air through the aforementioned variable flow orifice would be measured as the air flows out through the cylinder port 25. The valve retainer 20 would be adjusted inwardly or outwardly, as necessary to set the sharp edged poppet valve seat 40 to a position to permit the selected flow of air through the valve 10. When the adjustable sharp edged poppet valve seat 40 is in the position to give the selected air flow through the valve 10, the valve stroke length 64 of the poppet valve spool 43 is determined and measured, as illustrated in FIG. 1. The dimension between the inner end surface 59 of the poppet valve spool 43 and the outer end 68 of the pole piece 54 is measured, and from a supply of machined push pins of various lengths, a push pin 57 is selected which has a length to provide the required solenoid stroke length 63 of the solenoid armature 62, to actuate the poppet valve spool 43, through a precise axial movement, to move the poppet valve spool 43, as viewed in FIG. 1, through a stroke 64 to seat the angled poppet valve face 52 on the adjustable sharp edged poppet valve seat 40. It will be seen, that by providing the adjustable sharp edged poppet valve seat 40 and making the aforedescribed parts of the valve 72 and solenoid 12 to the described controlled lengths, that a poppet valve is provided with a preset stroke eliminating all of the tolerances associated with the mass production of component parts used in the assembly of the valve. The adjustable sharp edged poppet valve seat 40 may be adjusted to vary the air flow through the orifice between the sharp edged poppet valve seat 40 and the angled poppet valve face 52 to obtain the desired poppet stroke for the poppet valve 10.

It will be seen, that by holding the tolerances close in machining the aforementioned parts of the valve 72 and the solenoid 12, the moving parts of the valve 72 and the solenoid 12 can be made and assembled with an overall minimum tolerance for said parts. After a poppet stroke is set by adjusting the seat 40, the dimension 65 from the inner end 59 of the poppet valve spool 43 to the inner end 68 of the pole piece 54 is measured, and a push pin 57 is selected from an inventory of push pins to provide a solenoid stroke 63 sufficient to move the poppet valve spool 43 through the required valve stroke 64. The solenoid stroke 63 is made to a length longer than the valve stroke 64 by an amount sufficient to account for the slight compression of the angled poppet valve face 52 when it seats on the sharp edged valve seat 40. In one three-way valve 10 made in accordance with the invention, the valve stroke 64 was 0.13 millimeters in length and the solenoid stroke was set at 0.20 millimeters.

In use, with the poppet valve spool 43 in the initial position shown in FIG. 1, pressurized air entering the inlet port 14 is blocked from the supply port 25 and the exhaust port 35, and the supply port 25 is in communication with the exhaust port 35. When the solenoid 12 is energized the poppet valve spool 43 is moved to the right, to open the flow path between the inlet port 14 and the supply port 25, and to block communication between the supply port 25 and the exhaust port 35. The details of the operation of a three-way valve as illustrated in FIG. 1, is described more fully in U.S. Pat. Nos. 4,298,027 and 4,829,275, and the description of the operation of such three-way valves described in detail therein is incorporated herein by reference.

FIG. 2 illustrates the application of the principles of the invention to a direct solenoid operated four-way directional flow control poppet air valve, generally designated by the numeral 72, which includes a valve body generally designated by the numeral 73. A solenoid actuator is shown in fragment, and in section, and the reference numerals designating the solenoid parts shown are the same reference numerals as used in FIG. 1 for the solenoid 12, followed by small letter "a".

As shown in FIG. 2, the valve 72 is provided with a pair of mounting bolt holes 74 which extend through the valve body 73 and are adapted to receive suitable mounting bolts for securing the valve 72 in an operating position on an apparatus with which it is to be employed.

As shown in FIG. 2, the valve body 73 is provided with a threaded inlet port 75, which is adapted to be connected to a suitable source of pressurized air. The inlet port 75 communicates with an axial valve spool bore 76 in the valve body 73. The axial valve spool bore 76 is centered longitudinally in the valve body 73, and it communicates on the left side thereof, as viewed in FIG. 2, with an enlarged diameter axial bore 77 that has a further enlarged diameter threaded outer end bore 78 which is open at the left end of the valve body 73, as viewed in FIG. 2. The left end surface 79 of the valve body 73 is a control surface, and functions in the same manner as the valve body control surface end 55 in the first embodiment of the invention illustrated in FIG. 1. The right end of the axial valve spool bore 76, as viewed in FIG. 2, communicates with an enlarged diameter axial bore 80 which is of the same diameter as the axial bore 77. The enlarged diameter axial bore 80 extends to the right end of the valve body 73 and terminates in a further enlarged diameter threaded end bore 81. The valve 72 is provided with a pair of cylinder ports 82 and 83 which communicate with the enlarged axial bores 77 and 80, respectively.

A fixed sharp edged poppet valve seat 86 is formed in the valve body 73, at the transverse junction point between the axial valve spool bore 76 and a transverse passage 87 which communicates the inlet port 75 with the axial valve spool bore 76.

Figure 6:
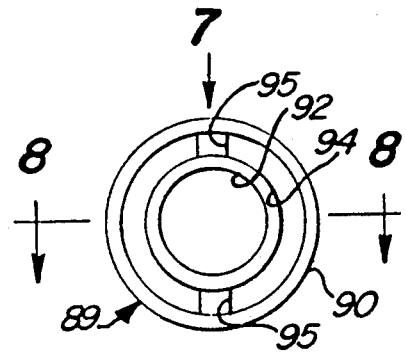
FIG. 6 is a rear elevation view of the threaded adjustable poppet valve seat structure shown in FIGS. 2 and 4.
Figure 7:
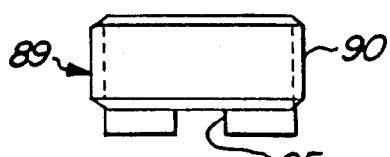
FIG. 7 is a top view of the threaded adjustable poppet valve seat shown in FIG. 6, taken in the direction of the arrow "7".

As shown in FIG. 2, an adjustable sharp edged poppet valve seat, generally designated by the numeral 88, is disposed to the right of the passage 87, and in a position spaced apart, but axially aligned with the fixed sharp edged poppet valve seat 86. The adjustable sharp edged poppet valve seat 88 is formed in a threadably mounted adjustable body, generally indicated by the numeral 89, which is cylindrical in shape and provided with a threaded outer periphery 90, as shown in more detail in FIGS. 6, 7 and 8. As shown in FIG. 2, the adjustable sharp edged poppet valve seat body 89 is threadably mounted in the reduced diameter, threaded inner end 91 of the axial bore 80.

Figure 8:
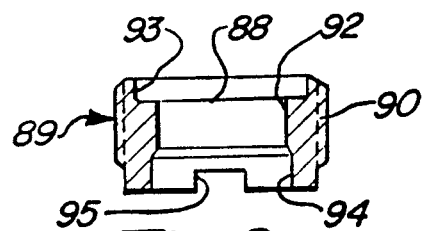
FIG. 8 is a horizontal section view of the threaded adjustable poppet valve seat shown in FIG. 6, taken along the line 8—8 thereof, and looking in the direction of the arrows.

As best seen in FIG. 8, the adjustable sharp edged poppet valve seat body 89 has formed therethrough a stepped diameter bore, including a central bore 92 which communicates at its front end with an enlarged bore 93 and at its rear end with an enlarged bore 94. It will be seen, that the junction point between the central bore 92 and the larger diameter front end bore 93 forms the adjustable sharp edged poppet valve seat 88. The adjustable sharp edged poppet valve seat body 89 is provided on the rear end thereof, with a pair of transverse slots 95 which are adapted to receive the end of an adjusting tool 142 for adjusting the adjustable sharp edged poppet valve seat body 89 in the threaded bore 91 (FIG. 2) in the valve body 73.

As shown in FIG. 2, the flow of pressurized air from the inlet port 75 and through the valve body 73 is controlled by a longitudinally movable poppet valve spool, generally indicated by the numeral 98. The poppet valve spool 98 comprises an elongated cylindrical body which includes a central portion 99, and two integral end portions 100 and 101. The poppet valve spool 98 is provided with a centrally located, annular radial flange 104 which is conically shaped and has angled outer end faces that converge toward each other, and on which are integrally molded, from a suitable elastomeric material, a pair of angled poppet valve faces 105 and 106.

As shown in FIG. 2, the enlarged left end 100 of the poppet valve spool 98 is slidably mounted in an axial bore 107 which is formed through a left end bushing 108 that is threaded on the outer periphery thereof, and threadably mounted in the threaded bore 78 in the valve body 73. The enlarged diameter right end 101 of the poppet valve spool 98 is slidably mounted in an axial bore 109 which is formed in a right end bushing 110 that is provided with a threaded outer periphery which is threadably mounted in the threaded bore 81 in the valve body 73. The enlarged right end 101 of the poppet valve spool 98 is seated against a valve spool return spring 114 which has an inner end seated in an axial bore 115 formed in the right end 101 of the poppet valve spool 98. The outer end of the return spring 114 is seated against the inner side of the bushing end wall 113.

As shown in FIG. 2, the poppet valve spool 98 is provided with a left end poppet valve element 118 which is molded around the outer periphery of the poppet valve spool 98, at the junction point between the left end of the central portion 99 and the left end enlarged portion 100 of the poppet valve spool 98. A similar right end poppet valve element 119 is positioned at the junction point between the poppet valve spool central portion 99 and the right end enlarged portion 101. The left and right end bushings 108 and 110 are cylindrical, and they each have a cylindrical inner end reduced diameter portion 120 and 121, respectively, which are slidably mounted in the axial bores 77 and 80, respectively. A suitable O-ring 122 is operatively mounted in a groove formed around the outer periphery of the left bushing inner end 120. A similar O-ring 122 is operatively mounted in a groove formed around the periphery of the inner end 121 of the right end bushing 110. As shown in FIG. 2, a conically angled poppet valve seat 123 is formed on the left end bushing inner end 120, and an identical conically angled poppet valve seat 124 is formed on the right end bushing inner end 121.

As shown in FIG. 2, the valve body 73 has formed therein a first exhaust port 128 which communicates with the cylinder port 82 through a stepped diameter passage 129 formed through the left end bushing 108, a bore 130 through the inner end of the left end bushing 108 and the bore 77. A second exhaust port 131 in the valve body 73 communicates with the cylinder port 83 through a stepped passage 132 formed through the inner end of the right end bushing 110, an axial bore 133 formed through the right end bushing inner end 121, and the axial bore 80.

As shown in FIGS. 2 and 3, the outer ends of the bushings 108 and 110 are provided with spaced apart, transverse wrench surfaces 134, for the acceptance of a suitable wrench for threadably rotating the end bushings 108 and 110 to a desired adjusted position.

The solenoid 12a for the four-way valve 72 is structurally and functionally the same as described hereinbefore, for the solenoid 12 employed in the first embodiment of FIG. 1. The push pin 57a seats against the left end 136 of the poppet valve spool 98.

In use, with the poppet valve spool 98 in the initial or first position shown in FIG. 2, and with the solenoid 12a de-energized, when pressurized air is admitted into the inlet port 75 it will flow past the open valve seat 88 and into the valve bore 80, and out through the cylinder port 83 to the air cylinder or other apparatus being operated by the valve 72. Simultaneously, air from said air cylinder or other apparatus is exhausted into the cylinder port 82 and it flows through the axial bore 77 and past the open poppet valve seat 123, and through the stepped passage 129 and out of the valve 72 through the exhaust port 128.

When the solenoid 12a is energized the poppet valve spool 98 is moved to the right, to a second operating position, wherein the angled poppet valve face 105 seats on the poppet valve seat 88, and the left end poppet valve element 118 seats on the poppet valve seat 123. Inlet pressurized air then flows from the inlet port 75, and past the valve seat 86 and into the axial bore 77, and into the cylinder port 82, and thence to the air cylinder or other apparatus being controlled. Simultaneously, air from said air cylinder or other apparatus being controlled enters the port 83 and passes into the axial bore 80 and through the axial bore 133 in the right end bushing inner end 121 and out through the stepped passage 132 and out of the valve 72 through the exhaust port 131.

Details of the operation of a substantially similar four-way valve as illustrated in FIG. 2, is described more fully in U.S. Pat. No. 4,574,844, and a description of the operation of such four-way valve described in detail in said patent is incorporated herein by reference.

The numeral 137, in FIG. 2 designates the length of the stroke of the solenoid armature 62a when the solenoid 12a is de-energized. The numeral 138 designates the length of stroke of the poppet valve spool 98 before it is moved to the right from its initial operative position shown in FIG. 1, to a second operative position wherein the angled poppet valve face 105 seats on the sharp edged poppet valve seat 88.

The left end surface 79 of the valve body 73 functions as a control surface from which the dimensions of the hereinafter discussed parts of the valve 72 and the solenoid 12 are measured and controlled with minimum tolerance. The valve body end surface 79 is accurately machined to receive the outer end surface 67a of the solenoid pole piece 54a. The length of the pole piece 54a is determined, and the inner end 68a of the pole piece 54a is machined to control the length of the pole piece 54a between its ends 67a and 68a with a minimum tolerance. The length of the portion of the valve body 73, between the valve body control end surface 79 and the fixed sharp edged poppet valve seat 86, is determined and machined with a minimum tolerance. The dimensional length of the poppet valve spool 98, between its left end surface 136 and the poppet valve seat contact point on the angled poppet valve face 106, where it seats on the fixed sharp edged poppet valve seat 86 is determined, and the length between the seating points on the angled poppet valve faces 105 and 106 is determined.

In accordance with the invention, the adjustable sharp edged poppet valve seat body 89 may be threadably adjusted in the threaded bore 91 to preset the sharp edged poppet valve seat 88 in a position to provide a preset flow of air through the orifice between the sharp edged poppet valve seat 88 and the angled poppet valve face 105 by the following described procedure. The valve body 73 is installed in an appropriate assembly fixture with all valve parts in place except the right end bushing 110. The adjustable poppet valve seat body 89 is installed over the spring end 101 of the poppet valve spool 98, with the drive slots 95 facing outward. The poppet valve spool 98 is installed in the valve body 73 at a position where the angular poppet face 106 contacts the fixed poppet seat 86. The spring 114 is installed in the spring pocket 115. The seat adjusting tool 142 is then inserted over the poppet valve spool 98 until the drive fingers 145 engage the drive slots 95 on the adjustable poppet valve seat body 89.

Figure 4:
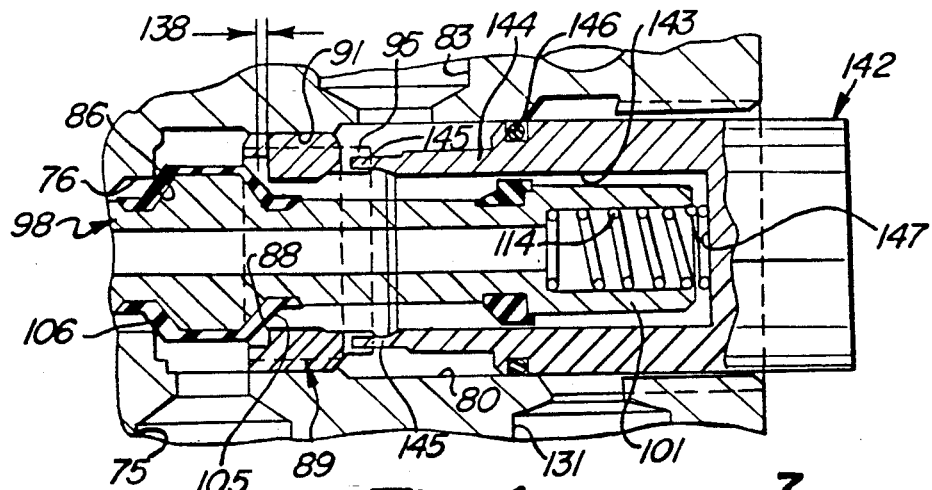
FIG. 4 is a fragmentary, right end section view of the four-way directional flow control poppet air valve showing the hand tool, used for adjusting the threaded adjustable poppet valve seat for the central poppet valve element.
Figure 5:
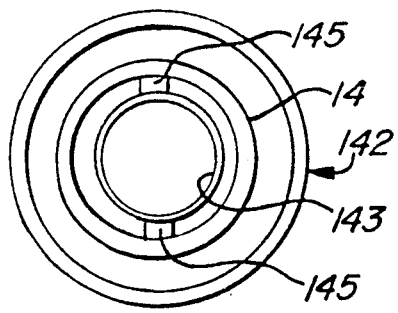
FIG. 5 is an elevation view of the left end of the valve seat adjusting tool shown in FIG. 4.

As shown in FIG. 4, the valve seat adjusting tool 142 has an axial bore formed in the front end thereof, and it extends rearwardly and terminates at an end wall 147. An O-ring 146 is operatively mounted in a groove formed around the outer periphery of the cylindrical valve seat adjusting tool 142, and it sealingly engages the axial bore 80 to seal any flow of air out of the exhaust port 131. The front end of the valve seat adjusting tool 142 has an integral, reduced diameter front end portion 144, which is provided on its front outer end with a pair of integral, diametrically spaced apart drive fingers 145 that are adapted to be seated in and mesh with the drive slots 95 formed in the rear end of the adjustable poppet valve seat body 89. It will be seen, that the adjustable valve seat body 89 may be adjusted forwardly or rearwardly by rotating the valve seat adjusting tool 142 in the appropriate direction in order to change the flow capacity through the variable orifice formed between the adjustable valve seat 88 and the angled poppet valve face 105.

In carrying out the adjustment procedure to set the adjustable poppet valve seat 88 to a desired position to provide a selected preset flow of air thereby, the inlet port 75 is connected to a source of air under pressure and the flow of air through the variable flow orifice between the adjustable poppet valve seat 88 and the angled poppet valve face 105 passes into the axial bore 80 and out through the cylinder port 83, and it is measured, by any suitable flow meter as it flows out of the cylinder port 83. The adjustable valve seat body 89 is then adjusted by the valve seat adjusting tool 142 until the selected preset flow of air exiting from the cylinder port 83 is obtained. The valve seat adjusting tool 142 is then replaced by the right end bushing 110.

In one four-way valve 72 made in accordance with the invention, the valve stroke 138 was 0.13 millimeters in length for a preset flow of air and the solenoid stroke was set at 0.20 millimeters, for the selected preset flow of air to be passed through and, controlled by the valve 72.

Figure 9:
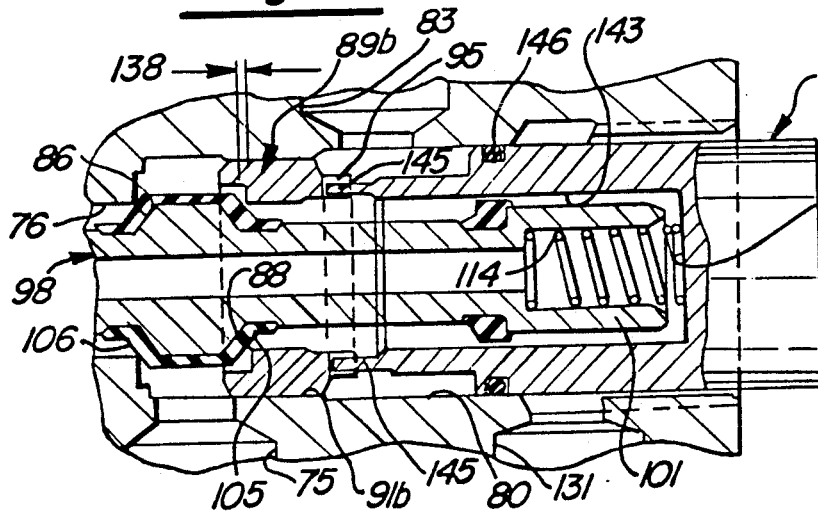
FIG. 9 is a fragmentary view, similar to the valve structure shown in FIG. 4, but with the adjustable poppet valve seat being mounted in place by a press fit.

FIG. 9 shows a fragmentary portion of the four-way valve illustrated in FIG. 2. The valve structure and valve seat adjusting tool 142 shown in FIG. 9 is the same as shown in FIG. 4, with the exception that the adjustable poppet valve seat body is indicated by the numeral 89b and the outer periphery thereof is not threaded, but is provided with a smooth cylindrical surface. Also, the valve body threaded bore 91 is replaced with a smooth cylindrical bore 91b, whereby the adjustable valve seat body 89b is adapted to be mounted in the bore 91b with a press fit. The valve seat adjusting tool 142 is adapted to move the adjustable poppet valve seat body 89b axially inward, or to the left, as viewed in FIG. 9, to a position to give a selected preset flow of air through the valve.

The fixed sharp edged poppet valve seats 24 and 86 may also each be termed a stop means.

What is claimed is:

1. A four-way poppet air valve (72) characterized by:
   (a) a valve body (73) having an axial valve spool bore (76) formed longitudinally therethrough;
   (b) an annular pressurized air supply transverse passage (87) formed in said valve body (73) around said valve spool bore (76), and communicating therewith, and having a first annular sharp edged poppet valve seat (86) fixedly formed in a side wall of the transverse passage (87) in the valve body (73), at the transverse junction point between the axial valve spool bore (76) and said transverse passage (87);
   (c) a second annular adjustable sharp edged poppet valve seat (88), formed on an annular body (89) which is adjustably mounted in an enlarged stepped diameter axial bore (91) of a stepped diameter (90) in one end of the valve spool bore (76), and the other end of the valve spool bore (76) includes an axial stepped diameter bore (77) (78), and annular body (89) is in a position longitudinally spaced apart from said fixed poppet valve seat to form another side wall of the transverse passage (87);
   (d) a poppet valve spool (98) slidably mounted in said valve spool bore (76) and provided with a poppet valve element (104) formed around the periphery thereof at a longitudinal central position, and having a diameter larger than the diameter of the valve spool bore (76), and said poppet valve element (104) having a poppet valve face (105) (106) formed on each of the opposite longitudinal peripheral sides thereof for alternate seating on the fixed and adjustable annular sharp edged poppet valve seats;
   (e) a pressurized air inlet port (75) in said valve body (73) and connected by passageway means to said pressurized air supply transverse passage (87);
   (f) a pair of cylinder ports (82) (83) formed in said valve body (73), and each of said cylinder ports being connected by passageway means to portions (77) (80) of the valve spool bore (76), on one longitudinal side of said transverse passage (87);
   (g) a pair of exhaust ports (128) (131) formed in said valve body (73), and connected by passageway means to portions (77) (80) of the valve spool bore (76), on the longitudinal outward sides of said cylinder ports (82) (83);
   (h) a first bushing (110) having an axial bore (109) with a diameter smaller than the diameter of the valve spool bore (76) and being adjustably mounted in one end of said valve body (73), and being telescopically mounted over one end (101) of said poppet valve spool (98), and having a first outer end, annular poppet valve seat (124) formed thereon and around said valve spool (98) and facing longitudinally outward;
   (i) a second bushing (108) having an axial bore (107) with a diameter smaller than the diameter of the valve spool bore (76) and being adjustably mounted in the other end of said valve body (73), and being telescopically mounted over the other end (100) of the poppet valve spool (98), and having a second outer end, annular poppet valve seat (123) formed thereon and around said poppet valve spool (98) and facing longitudinally outward;

(j) a first poppet valve element (119) having a diameter identical to the diameter of the valve spool bore (76) and being mounted around the periphery of one end of said poppet valve spool (98) and having a poppet valve face disposed longitudinally inward, and a second poppet valve element (118) having a diameter identical to the diameter of the valve spool bore (76) and being mounted around the periphery of the other end of the poppet valve spool (98) and having a poppet valve face disposed longitudinally inward, for alternative seating engagement with said first (124) and second (123) outer end poppet valve seats, respectively;

(k) a biasing means (114) operatively mounted in said first bushing (110) and engagable with said one end of the poppet valve spool (98) for normally moving it into, and maintaining it in, a first operative position with the first poppet valve element (119) on said one end of the poppet valve spool (98) in seating engagement on the first outer end poppet valve seat (124) on said first bushing (110), and with a first one (106) of the poppet valve faces on the central positioned poppet valve element (104) on the valve spool (98) in seating engagement on said first annular, fixed sharp edged poppet valve seat (86) formed at the one side of the transverse passage (87), so as to allow pressurized air to flow through the valve spool bore (76) and into one the cylinder ports (83), and for simultaneously exhausting air entering into the other cylinder port (82) and through the valve spool bore portion (77) and out one (128) of said exhaust ports;

(1) a solenoid (12a) operatively mounted on the valve body (73) and directly engagable with the other end of the poppet valve spool (98) for moving the poppet valve spool (98) from said first operative position longitudinally to a second operative position, against the bias of said biasing means, with the second poppet valve element (118) on the other end of the valve spool (98) in seating engagement on the second outer end poppet valve seat (123) on said second bushing (108), and with the other one of the poppet valve faces (105) on the central positioned poppet valve element (104) on the valve spool (98) in seating engagement on the annular adjustable sharp edged valve seat (88), so as to allow pressurized air to flow through the valve spool bore (73) and out the other one (131) of said exhaust ports.

2. A four-way poppet air valve (72) as defined in claim 1, characterized in that:

(a) said adjustably mounted sharp edged poppet valve seat (89) is threadably mounted in said valve body (73).

3. A four-way poppet air valve (72) as defined in claim 1, characterized in that:

(a) said adjustably mounted sharp edged poppet valve seat (89b) is mounted in the valve spool bore (76) by a press fit.

4. A four-way poppet air valve (72) as defined in claim 1, characterized in that:

(a) said solenoid (12a) for moving the valve spool (98) to a second position includes a pole piece (54a) directly mounted on the valve spool body (73).

* * * * *